(12) United States Patent
Huang et al.

(10) Patent No.: US 10,112,295 B2
(45) Date of Patent: Oct. 30, 2018

(54) REMOTE CONTROL SYSTEM FOR POINTING ROBOT

(71) Applicant: PixArt Imaging Inc., Hsin-Chu County (TW)

(72) Inventors: Sen-Huang Huang, Hsin-Chu County (TW); Yi-Hsien Ko, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 38 days.

(21) Appl. No.: 15/667,799

(22) Filed: Aug. 3, 2017

(65) Prior Publication Data
US 2017/0326725 A1    Nov. 16, 2017

Related U.S. Application Data

(62) Division of application No. 15/493,503, filed on Apr. 21, 2017, which is a division of application No. 14/217,708, filed on Mar. 18, 2014, now Pat. No. 9,704,390.

(30) Foreign Application Priority Data

Jun. 7, 2013 (TW) ............... 102120456 U

(51) Int. Cl.
| | |
|---|---|
| H04N 5/232 | (2006.01) |
| B25J 9/16 | (2006.01) |
| G08C 17/02 | (2006.01) |
| G05D 1/00 | (2006.01) |
| G08C 23/04 | (2006.01) |
| G05D 1/02 | (2006.01) |
| B25J 11/00 | (2006.01) |
| A63H 30/04 | (2006.01) |

(52) U.S. Cl.
CPC ............ *B25J 9/161* (2013.01); *G05D 1/0016* (2013.01); *G05D 1/0033* (2013.01); *G05D 1/0246* (2013.01); *G08C 17/02* (2013.01); *G08C 23/04* (2013.01); *H04N 5/23229* (2013.01); *A63H 30/04* (2013.01); *B25J 11/0085* (2013.01); *G05D 2201/0214* (2013.01)

(58) Field of Classification Search
CPC .............................. G08C 17/02; G08C 23/04
USPC ....................................................... 348/114
See application file for complete search history.

(56) References Cited

U.S. PATENT DOCUMENTS

| | | | |
|---|---|---|---|
| 2008/0082208 A1 | 4/2008 | Hong et al. | |
| 2013/0278398 A1 | 10/2013 | Smetanin et al. | |

FOREIGN PATENT DOCUMENTS

| | | |
|---|---|---|
| CN | 101154110 A | 4/2008 |
| CN | 101909379 A | 12/2010 |
| CN | 102903227 A | 1/2013 |
| TW | 201318793 A1 | 5/2013 |
| TW | M454237 U1 | 6/2013 |

*Primary Examiner* — Nguyen Truong
(74) *Attorney, Agent, or Firm* — Hauptman Ham, LLP

(57) ABSTRACT

There is provided a remote control system including a controlled device and a remote device. The controlled device has a light source and moves according to a control signal from the remote device. The remote device is adapted to be operated by a user and includes an image sensor. The remote device determines a moving direction of the controlled device according to an imaging position of the light source in the image captured by the image sensor and a pointing position of the user, and outputs the control signal.

10 Claims, 3 Drawing Sheets

REMOTE CONTROL SYSTEM FOR POINTING ROBOT

RELATED APPLICATIONS

The present application is a divisional application of U.S. application Ser. No. 15/493,503, filed on Apr. 21, 2017, which is a divisional application of U.S. application Ser. No. 14/217,708, filed on Mar. 18, 2014, which claims priority to Taiwanese Application Number 102120456, filed Jun. 7, 2013, the disclosure of which is hereby incorporated by reference herein in its entirety.

BACKGROUND

1. Field of the Disclosure

This disclosure generally relates to a remote control system and, more particularly, to a remote control system for a pointing robot.

2. Description of the Related Art

The conventional remote control system includes, for example, a remote control car and a remote controller. The remote control car can move according to an electric wave signal sent by the remote controller. The remote control car generally includes a switch configured to activate a receiver so as to allow the remote control car to standby or move straight at a predetermined velocity. The remote controller includes a plurality of buttons thereon, for example, including a plurality of direction keys configured to control moving directions of the remote control car. To improve the pointing accuracy, some remote controllers are disposed with a joystick for replacing the direction keys for providing more controllable directions. Therefore, users may use the joystick of the remote controller to control the remote control car to turn to any angle.

However, as the user's visual line is not consistent with the current moving direction of a controlled device, the user has to consider the steering based on the visual line of the controlled device during operation. For example, when the user sends a left-turn instruction through the remote controller to the remote control car, the user may see the remote control car turning left if the user's visual line is identical to the moving direction of the remote control car; on the contrary, the user may see the remote control car turning right if the user's visual line is opposite to the moving direction of the remote control car. Therefore, the direction control in the conventional remote control system is not intuitive for the user.

Another remote control system uses a laser guiding beam to replace the control through the above mentioned mechanical buttons. The remote control system includes a controlled device and a remote device. The remote device is disposed with a laser. The controlled device has a camera configured to capture images of an orientation point of the laser guiding beam and moves toward the orientation point. Compared with the above mentioned method, this kind of remote device significantly simplifies the arrangement of buttons and is able to improve user's operating experience. However, the camera of the controlled device has to perform a 360-degree panoramic scanning so as to capture the image of the laser guiding beam. Meanwhile, as the identifying process can be easily interfered by ambient light thus the remote control system has problems of long response time and low accuracy.

Accordingly, the present disclosure further provides a remote control system that can move the controlled device efficiently and accurately without complicated buttons.

SUMMARY

The present disclosure provides a remote control system including a controlled device and a remote device. The controlled device has a light source and moves according to a control signal from the remote device. The remote device is adapted to be operated by a user and includes an image sensor. The remote device determines a moving direction of the controlled device according to an imaging position of the light source in an image captured by the image sensor and a pointing position of the user, and outputs the control signal.

The present disclosure provides a remote control system, and a controlled device thereof includes a light source emitting light with different characteristics such as different flicker frequencies, light emitting areas or light emitting shapes corresponding to different operating modes. The remote device may identify the operating mode of the controlled device according to the different characteristics of the light source so as to send a control signal, and the control signal may include instructions of an operating mode and a moving direction.

The present disclosure further provides a remote control system, and a remote device thereof only uses a switch (e.g. a mechanical button or a capacitive switch) to generate a control signal. Thus, the control procedure can be simplified.

The present disclosure provides a remote control system including a controlled device and a remote device. The controlled device includes a light source. The remote device includes an image sensor and a processor. The image sensor is configured to capture a first image and a second image containing the light source. The processor is configured to calculate a current motion vector of the controlled device according to an imaging position of the light source respectively in the first image and the second image, calculate a pointing vector according to the imaging position of the light source in the second image and a pointing position, and determine a moving direction of the controlled device according to the current motion vector and the pointing vector The present disclosure further provides a remote control system including a controlled device and a remote device. The controlled device includes a first light source and a second light source. The remote device includes an image sensor and a processor. The image sensor is configured to capture an image containing the first light source and the second light source. The processor is configured to calculate a current moving direction of the controlled device according to imaging positions of the first light source and the second light source in the image, calculate a pointing vector according to the imaging position of the first light source or the second light source in the image and a pointing position, and determine a moving direction of the controlled device according to the current moving direction, the pointing vector and the imaging position of the first light source or the second light source.

The present disclosure further provides a remote control system including a controlled device and a remote device. The controlled device includes a light source having a predetermined pattern. The remote device includes an image sensor and a processor. The image sensor is configured to capture an image containing the predetermined pattern. The processor is configured to identify a current moving direction of the controlled device according to the predetermined pattern in the image, calculate a pointing vector according to an imaging position of the light source in the image and a pointing position, and determine a turning angle of the controlled device according to the current moving direction, the pointing vector and the imaging position.

In one embodiment, the controlled device further includes a receiver and the remote device further includes a transmitter. The processor sends the moving direction, turning angle or mode instruction to the receiver through the transmitter. The transmitter may perform the data transmission by infrared light or a radio wave.

In one embodiment, the light source may emit light constantly without the flicker or emit light at a flicker frequency. The controlled device may be a cleaning robot having at least one operating mode corresponding to the flicker frequency of the light source, wherein the operating mode may include a moving velocity and/or an operating strength.

In one embodiment, the processor may further determine a moving velocity, a travel distance and/or a destination of the controlled device according to a magnitude of the current motion vector and/or the pointing vector.

The remote control system for the pointing robot according to the embodiment of the present disclosure may determine a turning angle, a moving direction and/or a travel distance of the controlled device according to light source images of the controlled device through vector operations. Accordingly, a user can control motions of the controlled device more intuitively.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

In the following descriptions, a remote control device of the present disclosure is described with embodiments in which an image sensor is used to replace the conventional laser guiding beam. However, the embodiment of the present disclosure is not limited to any particular environment, application or implementation. Therefore, the following descriptions of embodiments are for purpose of illustration only. It is understood that elements indirectly related to the present disclosure are omitted and not shown in the following embodiments and drawings.

Figure 1:
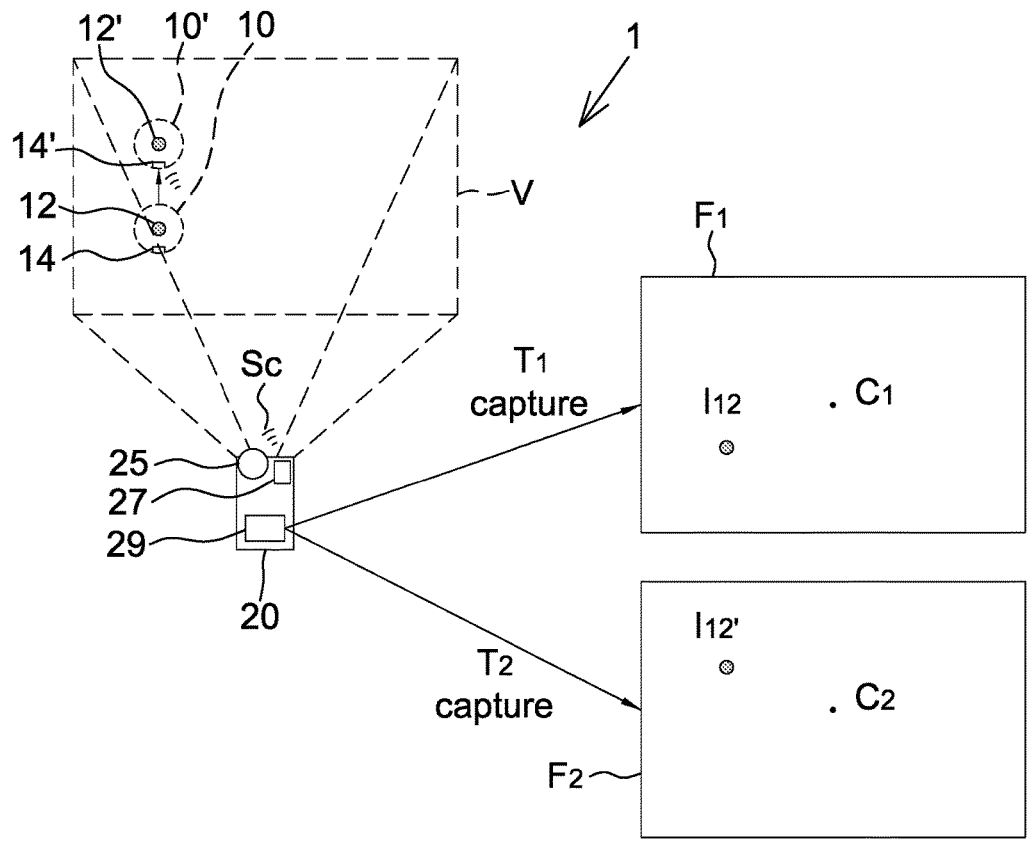
FIG. 1 shows a schematic diagram of a remote control system according to the first embodiment of the present disclosure.

FIG. 1 shows a schematic diagram of a remote control system 1 according to the first embodiment of the present disclosure, for example the remote control system for a pointing robot. The remote control system 1 includes a controlled device 10 and a remote device 20. A user may control the controlled device 10 though the remote device 20, for example controlling a moving direction, a moving velocity, a travel distance, a turning angle and/or an operating strength of the controlled device 10.

The controlled device 10 has a light source 12 and a receiver 14. The light source 12 may emit light with an adjustable flicker frequency or light on constantly without the flicker to be served as a reference point for detecting positions of the controlled device 10. The receiver 14 is configured to perform one-way or two-way communication with the remote device 20. It should be mentioned that the position of the light source 12 of the controlled device 10 shown in FIG. 1 is not used to limit the present disclosure. In the present embodiment, the controlled device 10 may be a pointing robot capable of performing predetermined functions, such as a cleaning robot, but not limited to. The controlled device 10 may be any device whose function is controlled by using the remote device.

The remote device 20 includes an image sensor 25, a transmitter 27 and a processor 29, wherein the processor 29 is electrically connected with the image sensor 25 and the transmitter 27. In one embodiment, the remote device 20 may further include at least one switch (not shown) for being operated by the user, and the switch may be a mechanical switch or a capacitive switch configured to activate the image sensor 25 to capture images and activate the transmitter 27 to send a control signal $S_C$.

In the present embodiment, the image sensor 25 is preferably located at a front end of the remote device 20, and thus when the remote device 20 is for handheld use by the user, the pointing direction thereof is substantially at the extension direction of the user's arm. The image sensor 25 captures images with a predetermined visual angle V and is configured to capture the images covering the light source 12 of the controlled device 10. The processor 29 performs vector operations according to a two dimensional space formed by the images. For example, FIG. 2 shows a schematic diagram of a two-dimensional (2D) space 2DS formed by images captured by the image sensor 25.

Figure 2:
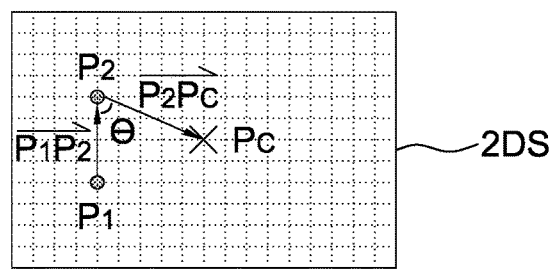
FIG. 2 shows a schematic diagram of a two dimensional space formed by images captured by the image sensor according to the first embodiment of the present disclosure.

Referring to FIGS. 1 and 2, it is assumed that the image sensor 25 captures a first image $F_1$ containing the light source 12 and having an image center $C_1$ (e.g. a pointing position of a user) at a time $T_1$; and then the processor 29 may identify a light source image $I_{12}$ of the light source 12 in the first image $F_1$ and map the first image $F_1$ to a two dimensional coordinate system such as a polar coordinate system or a Cartesian coordinate system. At this time, the image center $C_1$ of the first image $F_1$ corresponds to a 2D space center $P_C$, and a position of the light source image $I_{12}$ in the first image $F_1$ is recorded as a first imaging position $P_1$. Similarly, assuming at a time $T_2$, the image sensor 25 captures a second image $F_2$ containing the light source 12' and having an image center $C_2$ (e.g. a pointing position of a user); and then the processor 29 may identify a light source image $I_{12}$' of the light source 12' in the second image $F_2$ and map the second image $F_2$ to the two dimensional coordinate system. At this time, the image center $C_2$ of the second image $F_2$ corresponds to the 2D space center $P_C$, and a position of the light source image $I_{12}'$ in the second image $F_2$ is recorded as a second imaging position $P_2$. It should be mentioned that the first imaging position $P_1$ and the second imaging position $P_2$ may be a center position, a gravity center position or other predetermined positions in an object image formed by the light source respectively, as long as the same definition is applied.

It should be mentioned that reference numerals 12 and 12' in FIG. 1 are only configured to represent a single light source at different times rather than different light sources. Similarly, reference numerals 10 and 10' and reference numerals 14 and 14' are only configured to represent a single device at different times rather than different devices.

In the present embodiment, the processor 29 uses the space transform to transfer the first image $F_1$ and the second image $F_2$ to the same 2D space thereby performing vector operations. In one embodiment, the second image $F_2$ may be transferred to a 2D space formed by the first image $F_1$. In another embodiment, the first image $F_1$ may be transferred to a 2D space formed by the second image $F_2$. In another embodiment, both the first image $F_1$ and the second image $F_2$ may be transferred to another 2D space respectively thereby performing the followed vector operations. For example, when the vector operation is performed using the 2D space formed by the first image $F_1$, the image center $C_1$ may be served as the 2D space center $P_C$; when the vector operation is performed using the 2D space formed by the second image $F_2$, the image center $C_2$ may be served as the 2D space center $P_C$; and when a 2D space not being formed by the first image $F_1$ and the second image $F_2$ is used, the image centers $C_1$ and $C_2$ may be mapped to the 2D space center $P_C$, wherein an easy way is to overlap the first image $F_1$ with the second image $F_2$ directly and identify the followed vector variations of the first imaging position $P_1$ and the second imaging position $P_2$.

Therefore, the processor 29 may obtain a current moving vector $\overrightarrow{P_1P_2}$ according to the first imaging position $P_1$ and the second imaging position $P_2$ in the 2D space 2DS, obtain a pointing vector $\overrightarrow{P_2P_C}$ according to the second imaging position $P_2$ and the 2D space center $P_C$ in the 2D space 2DS, and then determine a moving direction, e.g. the direction toward the 2D space center $P_C$ shown in FIG. 2, or a turning angle θ of the controlled device 10 through vector operations according to the current moving vector $\overrightarrow{P_1P_2}$, the pointing vector $\overrightarrow{P_2P_C}$ and the second imaging position $P_2$.

In the present embodiment, the transmitter 27 may send the moving direction by infrared light or a radio wave (e.g. Bluetooth) to the receiver 14. It is appreciated that FIGS. 1 and 2 only exemplarily show a shape of the visual angle V and the relative position between the light source 12, the receiver 14, the transmitter 27 and the image sensor 27, wherein the shape and size of the visual angle V may be determined according to the capturing angle and distance of the image sensor 25. Preferably, the processor 29 is able to transfer the image captured by the image sensor 25 to a quadrilateral-shaped or square-shaped 2D space for performing vector operations easily.

In one embodiment, if the processor 29 has the function of identifying color-levels or colors, the light source 12 of the controlled device 10 may be arranged to emit light with different brightness or colors to correspond to different operating modes of the controlled device 10. For example, the controlled device 10 works with a predetermined velocity and strength under a normal mode; the controlled device 10 works with a velocity and strength smaller than the predetermined one under a quiet mode; and the controlled device 10 works with a velocity and strength larger than the predetermined one under an enhanced mode. It should be mentioned that each mode described herein may be preset according to functions performed by the controlled device 10 before the shipment, but not limited to those described herein. Accordingly, in determining the moving direction of the controlled device 10, the processor 29 may also determine whether to change an operating mode of the controlled device 10 at the same time. Furthermore, the moving direction and the operating mode may be determined separately, and the number of the operating modes may be determined according to different applications.

In one embodiment, the light source 12 of the controlled device 10 may be arranged to flicker at different frequencies to correspond to different operating modes of the controlled device 10. The processor 29 may determine the moving direction according to the first image $F_1$ and the second image $F_2$, and further identify a current operating mode of the controlled device 10 according to a plurality of images. Therefore, every time when the image sensor 25 is activated (e.g. by pressing a switch), a plurality of images may be captured successively by the image sensor 25 but the captured image number is not limited to two. In addition, the first image $F_1$ and the second image $F_2$ are not limited to two adjacent images but two images separated by one or more than one images of a plurality of images captured successively. In the present embodiment, the light source 12 may be arranged to emit light at different flicker frequencies to correspond to different operating modes (e.g. the normal mode, quiet mode or enhanced mode) of the controlled device 10. When determining the moving direction of the controlled device 10, the processor 29 may also identify the flicker frequency according the plurality of images captured so as to determine whether to change an operating mode of the controlled device 10. Besides, if the controlled device 10 is set to be operated under the quiet mode, the controlled device 10 or the processor 29 may ignore any mode changing instruction.

In one embodiment, the processor 29 may further determine a moving velocity and/or a travel distance of the controlled device 10 according to the magnitude of at least one of the current moving vector $\overrightarrow{P_1P_2}$ and the pointing vector $\overrightarrow{P_2P_C}$. For example, when the magnitude (i.e. norm) of the pointing vector $\overrightarrow{P_2P_C}$ is larger than or smaller than a threshold, a control signal $S_C$ sent by the processor 29 may include the moving direction and mode changing information simultaneously, wherein the threshold may be a fixed value or determined according to a multiple of the magnitude of the current moving vector $\overrightarrow{P_1P_2}$. In addition, a plurality of thresholds may be included according to the number of changeable modes. The processor 29 may further determine whether the magnitude of the current moving vector $\overrightarrow{P_1P_2}$ matches the setting of the user to accordingly determine the mode change, or may directly control the moving velocity of the controlled device 10.

Figure 3:
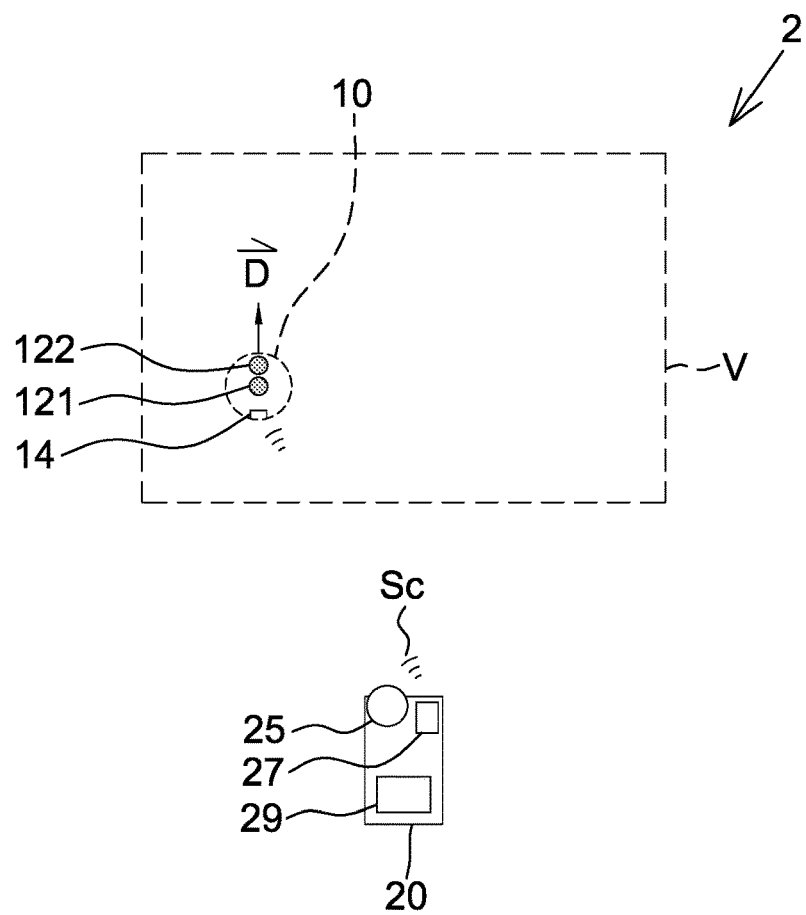
FIG. 3 shows a schematic diagram of a remote control system according to the second embodiment of the present disclosure.

FIG. 3 shows a schematic diagram of a remote control system 2 according to the second embodiment of the present disclosure, and the system may be a remote control system for a pointing robot and include a controlled device 10 and a remote device 20 as well. Similarly, a user may control the controlled device 10 through the remote device 20, e.g.

controlling an operating mode, a moving direction, a turning angle, a moving velocity, a travel distance and/or an operating strength.

The controlled device 10 has a first light source 121, a second light source 122 and a receiver 14, and moves in a predetermined moving direction $\vec{D}$ (e.g. ahead of the controlled device 10). The first light source 121 and the second light source 122 have different characteristics (described later) so as to be distinguished by the remote device 20. The receiver 14 is configured to perform one-way or two-way communication with the remote device 20. It should be mentioned that the positions of the first light source 121 and the second light source 122 of the controlled device 10 shown in FIG. 3 are not used to limit the present disclosure. As described in the first embodiment, the controlled device 10 may be a pointing robot for performing predetermined functions.

The remote device 20 includes an image sensor 25, a transmitter 27 and a processor 29, wherein the processor 29 is electrically connected with the image sensor 25 and the transmitter 27. As described in the first embodiment, the remote device 20 may further include at least one switch (not shown).

Figure 4:
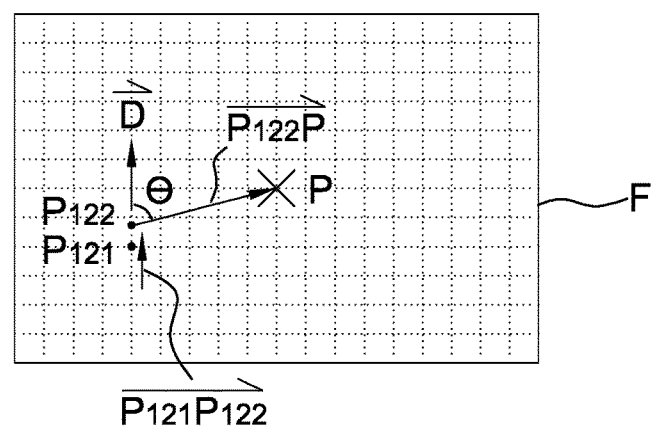
FIG. 4 shows a schematic diagram of the image captured by the image sensor according to the second embodiment of the present disclosure.

In the present embodiment, since the processor 29 identifies a moving direction of the controlled device 10 according to an image, which covers the first light source 121 and the second light source 122 of the controlled device 10, captured by the image sensor 25, the processor 29 may perform the vector operation directly using a 2D space formed by the image. The present embodiment directly uses the image captured by the image sensor 25 to describe vector operations. For example, FIG. 4 shows a schematic diagram of an image F captured by the image sensor 25. It is appreciated that when the image F is not a rectangle due to the capturing angle of the image sensor 25, the image F can be transferred to a rectangular 2D space using space transform for performing vector operations easily.

Referring to FIGS. 3 and 4, the image sensor 25 captures an image F containing the first light source 121 and the second light source 122. The processor 29 identifies the first light source 121 and the second light source 122 recorded as a first imaging position $P_{121}$ and a second imaging position $P_{122}$, as shown in FIG. 4, and the image F has an image center P. It should be mentioned that the first imaging position $P_{121}$ and the second imaging position $P_{122}$ may be the center position, gravity center position or other predetermined positions of an object image respectively, as long as the same definition is applied.

Therefore, the processor 29 may obtain a current moving direction $\overrightarrow{P_{121}P_{122}}$ of the controlled device 10 according to the first imaging position $P_{121}$ and the second imaging position $P_{122}$ in the image F; and herein it is assumed that the current moving direction $\overrightarrow{P_{121}P_{122}}$ and the predetermined moving direction $\vec{D}$ are identical (i.e. $\overrightarrow{P_{121}P_{122}}=\vec{D}$). The processor 25 may determine the predetermined moving direction D of the controlled device 10 according to the current moving direction $\overrightarrow{P_{121}P_{122}}$. Meanwhile, the processor 29 obtains a pointing vector $\overrightarrow{P_{122}P}$ according to the image center P and the second imaging position $P_{122}$ in the image F. Accordingly, a moving direction or a turning angle θ of the controlled device 10 may be determined through vector operations according to the current moving direction $\overrightarrow{P_{121}P_{122}}$, the pointing vector $\overrightarrow{P_{122}P}$ and the imaging position $P_{122}$, as shown in FIG. 4. The difference between the present embodiment and the first embodiment is that the first embodiment is able to identify the current moving direction of the controlled device 10 according to a position variation of the light source of the controlled device 10 in two images, whereas the processor 29 in the second embodiment identifies the current moving direction of the controlled device 10 according to two light sources in the same image. Other parts of the second embodiment are similar to those of the first embodiment, and thus details thereof are not described herein.

It should be mentioned that the current moving direction $\overrightarrow{P_{121}P_{122}}$ and the predetermined moving direction $\vec{D}$ are exemplarily set as the same direction (i.e. $\overrightarrow{P_{121}P_{122}}=\vec{D}$). In other embodiments, the current moving direction $\overrightarrow{P_{121}P_{122}}$ and the predetermined moving direction $\vec{D}$ may be different directions as long as they are preset before the shipment and transferred by the processor 29. In the present embodiment, as long as a relative position between the first light source 121 and the second light source 122 can be identified, it is able to identify the current moving direction $\overrightarrow{P_{121}P_{122}}$.

In addition, the present embodiment only exemplarily shows the pointing vector $\overrightarrow{P_{122}P}$ and a start point of the predetermined moving direction $\vec{D}$ being the second imaging position $P_{122}$. In another embodiment, the pointing vector may be $\overrightarrow{P_{121}P}$ and meanwhile the start point of the predetermined moving direction $\vec{D}$ may the first imaging position $P_{121}$.

In the present embodiment, the first light source 121 and the second light source 122 of the controlled device 10 have different characteristics such as different brightness, colors, areas or shapes. For example, it is assumed that the processor 29 has the function of identifying color-levels or colors, that the first light source 121 is composed of three LEDs and the light source 122 is composed of one LED, and that the brightness of the LEDs are the same. The processor 29 may identify positions of the first light source 121 and the second light source 122 using the function of identifying color-levels. Accordingly, the processor 29 may identify the relative position between the first light source 121 and the second light source 122 according to the above mentioned characteristics of the light sources thereby obtaining the current moving direction $\overrightarrow{P_{121}P_{122}}$ of the controlled device 10.

In addition, combinations of different brightness or colors of the first light source 121 and the second light source 122 may correspond to different operating modes of the controlled device 10 (e.g. the normal mode, the quiet mode and the enhanced mode). Accordingly, in determining the moving direction of the controlled device 10, the processor 29 may also determine whether to change an operating mode of the controlled device 10.

As described in the first embodiment, the first light source 121 and the second light source 122 may be arranged to emit light at different flicker frequencies as well so as to correspond to different operating modes (e.g. the normal mode, the quiet mode and the enhanced mode) of the controlled device 10 or for distinguishing different light sources. Thus, in determining the moving direction of the controlled device 10, the processor 29 also determines whether to change an operating mode of the controlled device 10.

As described in the first embodiment, the processor 29 may further determine a moving velocity and/or a travel distance of the controlled device 10 according to the magnitude of the pointing vector $\overrightarrow{P_{122}P}$. For example, the processor 29 may determine whether to change operating modes according to a result of the comparison between the pointing vector $\overrightarrow{P_{122}P}$ and at least one threshold. Since the determination method is similar to that of the first embodiment, details thereof are not described herein.

Figure 5:
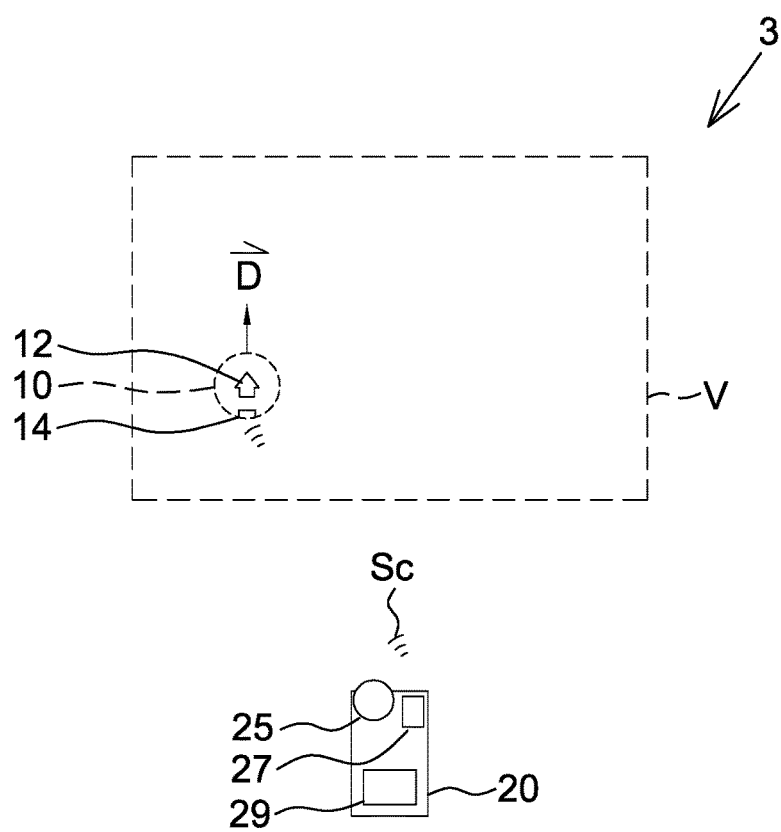
FIG. 5 shows a schematic diagram of a remote control system according to the third embodiment of the present disclosure.

FIG. 5 shows a schematic diagram of a remote control system 3 according to the third embodiment of the present disclosure, and the system may be a remote control system for a pointing robot and include a controlled device 10 and a remote device 20 as well. Similarly, a user can control the controlled device 10 through the remote device 20, e.g. controlling an operating mode, a moving direction, a turning angle, a moving velocity, a travel distance and/or an operating strength of the controlled device 10.

The controlled device 10 has a light source 12 and a receiver 14 and moves in a predetermined moving direction $\vec{D}$, wherein the light source 12 has a predetermined pattern configured to correspond to the predetermined moving direction $\vec{D}$ (e.g. an arrow pattern pointing toward the predetermined moving direction $\vec{D}$ as shown in FIG. 5). The light source 12 emits light with an adjustable flicker frequency or lights on continually to be served as a reference point for detecting positions of the controlled device 10. The receiver 14 is configured to perform the one-way or two-way communication with the remote device 20. It should be mentioned that the position of the light source 12 of the controlled device 10 shown in FIG. 5 is not used to limit the present disclosure. As mentioned in the first embodiment, the controlled device 10 may be a pointing robot for performing predetermined functions.

The remote device 20 includes an image sensor 25, a transmitter 27 and a processor 29, wherein the processor 29 is electrically connected with the image sensor 25 and the transmitter 27. As described in the first embodiment, the remote device 20 may further include at least one switch (not shown).

Figure 6:
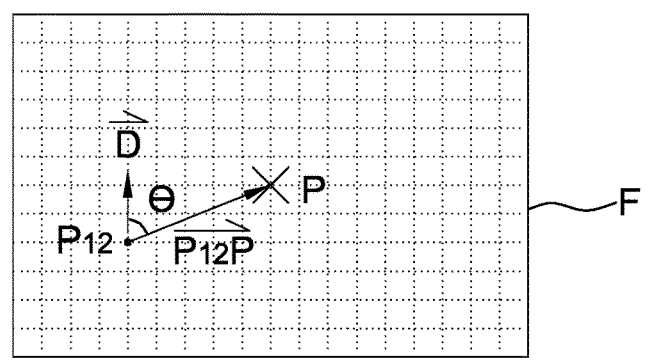
FIG. 6 shows a schematic diagram of the image captured by the image sensor according to the third embodiment of the present disclosure.

In the present embodiment, since the processor 29 determines a moving direction or a turning angle of the controlled device 10 according to an image covering the light source 12 of the controlled device 10 captured by the image sensor 25, the processor 29 may directly perform vector operations using a 2D space formed by the image. The present embodiment directly uses the image captured by the image sensor 25 to describe vector operations. For example, FIG. 6 shows a schematic diagram of an image F captured by the image sensor 25. It is appreciated that when the image F is not a rectangle due to the capturing angle of the image sensor 25, the image F can be transferred to a rectangular 2D space using space transform for performing vector operations.

Referring to FIGS. 5 and 6, the image sensor 25 captures an image F containing the light source 12, and then the processor 29 identifies the light source 12 to be recorded as an imaging position $P_{12}$ and an image center P, as shown in FIG. 6. Meanwhile, the processor 29 also determines the shape of the predetermined pattern of the light source 12. It should be mentioned that the imaging position $P_{12}$ may be a center position, a gravity center position or other predetermined positions of the object image (i.e. the light source image). For example, the imaging position $P_{12}$ in the present embodiment is defined as the center position of the predetermined pattern.

Therefore, the processor 29 may obtain the predetermined moving direction $\vec{D}$ of the controlled device 10 according to the imaging position $P_{12}$ and the shape of the predetermined pattern in the image F. For example, the shape of the predetermined pattern is an arrow and it is assumed that the pointing direction of the arrow is identical to the predetermined moving direction $\vec{D}$, as shown in FIG. 5. The processor 29 may determine the predetermined moving direction $\vec{D}$ of the controlled device 10 according to the predetermined pattern to be served as a current moving direction. Meanwhile, the processor 29 obtains a pointing vector $\overrightarrow{P_{12}P}$ according to the image center P in the image F, and then determines a turning angle θ or a moving direction through vector operations according to the current moving direction, the pointing vector $\overrightarrow{P_{12}P}$ and the imaging position $P_{12}$, as shown in FIG. 6. The difference between the present embodiment and the first embodiment is that the first embodiment is able to identify the current moving direction of the controlled device 10 according to a position variation of the light source of the controlled device 10 in two images, whereas the processor 29 in the third embodiment identifies the current moving direction of the controlled device 10 according to the shape of the light source 12. Other parts of the third embodiment are similar to those of the first embodiment, and thus details thereof are not described herein.

It should be mentioned that the shape of the predetermined pattern is only exemplarily shown as the arrow herein; but in other embodiments, the shape of the predetermined pattern may be a triangle, a pentagon or other asymmetric patterns as long as the shape can be identified by the processor 29 and associated with the predetermined moving direction $\vec{D}$. That is to say, as long as the processor 29 is able to identify the shape of the light source, the current moving direction (i.e. the predetermined moving direction $\vec{D}$) can also be identified.

In the present embodiment, since the processor 29 has the function of identifying shape patterns, the predetermined pattern of the light source 12 may also be formed by arranging a plurality of LEDs and a part of the LEDs is controlled to emit light to form different patterns corresponding to different operating modes (e.g. the normal mode, the quiet mode and the enhanced mode). Thus, in determining the moving direction of the controlled device 10, the processor 29 also determines whether to change an operating mode of the controlled device 10.

In another embodiment, if the processor 29 has the function of identifying color-levels or colors, the light source 12 of the controlled device 10 may be arranged to emit with different brightness or colors to correspond to different operating modes (e.g. the normal mode, the quiet mode or the enhanced mode) of the controlled device 10. Thus, in determining the moving direction of the controlled device 10, the processor 29 also determines whether to change an operating mode of the controlled device 10. Meanwhile, the light source 12 may emit light with different brightness or colors continuously to represent the current operating mode.

As mentioned in the first embodiment, the light source 12 may also emit light at different flicker frequencies to correspond to different operating modes (e.g. the normal mode, the quiet mode and the enhanced mode) of the controlled device 10. Thus, in determining the moving direction of the controlled device 10, the processor 29 also determines whether to change an operating mode of the controlled device 10.

As described in the first embodiment, the processor 29 further determines a moving velocity and/or a travel distance of the controlled device 10 according to the magnitude of the pointing vector $\overrightarrow{P_{12}P}$. For example, the processor 29 may determine whether to change operating modes according to a result of the comparison between the pointing vector $\overrightarrow{P_{12}P}$ and at least one threshold. Since the determination method is similar to the first embodiment, details thereof are not described herein.

In the above embodiments, the remote device 20 is preferably a hand-held remote device. In other embodiments, the remote device 20 may also be a portable electronic device, such as a smart phone having the function of infrared light or Bluetooth, wherein the camera function of the smart phone may correspond to the function of the image sensor 25 of the present disclosure.

The visual field of the image sensor 25 in the above embodiments preferably covers the whole controlled device 10 to ensure all the light sources are captured by the image sensor 25. The image sensor 25 may be a complementary metal-oxide-semiconductor (CMOS) image sensor or a charge-coupled device (CCD).

In one embodiment, the image sensor 25 in the above embodiments may be divided into a plurality of sub-regions according to the coordinate system applied by the processor 29. Taking a Cartesian coordinate system for example and referring to FIG. 2, it shows a schematic diagram of a matrix of the operation area divided into a plurality of sub-regions. That is to say, position information of at least one light point in the image may be retrieved from a lookup table, and the lookup table is formed by dividing the visual field of the image sensor into the matrix of the plurality of sub-regions.

The above light sources may be any conventional light sources such as a light-emitting diode (LED), a laser diode (LD) or other active light sources, but the present disclosure is not limited thereto. For example, it is able to use a translucent cover to expose the light emitted by an active light source thereby defining the shape of the light source. If an infrared light source is applied, it may avoid influencing the visual of users.

In the description of the present disclosure, a pointing position may be defined as an image center, and the pointing position may be mapped to a center of a 2D space when the image is mapped to the 2D space to perform vector operations. However, the pointing position may be defined as other predetermined positions in a captured image according to different applications, such as a corner of the captured image; and the pointing position may be mapped to a corresponding position in a 2D space when the image is mapped to the 2D space to perform vector operations.

As mentioned above, the conventional remote control system incorporating a plurality of buttons or a laser guiding beam to implement operations has problems of low accuracy and long response time respectively. Therefore, the present disclosure further provides a remote control system for a pointing robot that may determine a turning angle, a moving direction, a moving destination and/or a travel distance of the controlled device according to the light source image(s) of the controlled device by using the vector operation. Accordingly, a user can control motions of the controlled device more intuitively.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A remote device, configured to control a controlled vehicle device, the remote device comprising:
   an image sensor configured to capture an image containing an object image of the controlled vehicle device, wherein the object image contains a pattern formed on the controlled vehicle device; and
   a processor configured to determine a moving direction of the controlled vehicle device according to an orientation of the pattern of the object image in the captured image and an imaging position of the pattern of the object image in the captured image.

2. The remote device as claimed in claim 1, wherein the pattern is an arrow pattern, a triangle pattern or a pentagon pattern.

3. The remote device as claimed in claim 2, wherein the processor is configured to identify a shape of the pattern to determine the orientation of the pattern of the object image.

4. The remote device as claimed in claim 1, wherein the processor is further configured to identify different patterns to determine an operating mode of the controlled vehicle device.

5. The remote device as claimed in claim 1, wherein the processor is further configured to identify different brightness of the pattern to determine an operating mode of the controlled vehicle device.

6. The remote device as claimed in claim 1, wherein the processor is further configured to identify different colors of the pattern to determine an operating mode of the controlled vehicle device.

7. The remote device as claimed in claim 1, wherein the processor is further configured to identify different flicker frequencies of the pattern to determine an operating mode of the controlled vehicle device.

8. The remote device as claimed in claim 1, wherein the processor is further configured to determine a turning angle of the controlled vehicle device according to the determined moving direction, the imaging position of the pattern of the object image and a center of the captured image captured by the image sensor.

9. The remote device as claimed in claim 1, wherein the imaging position of the pattern of the object image is a center position or a gravity center position of the pattern of the object image.

10. The remote device as claimed in claim 1, wherein the pattern is formed by at least one light source on the controlled vehicle device.

* * * * *